US011474869B2

(12) United States Patent
Beaty et al.

(10) Patent No.: US 11,474,869 B2
(45) Date of Patent: *Oct. 18, 2022

(54) CENTRAL PLANT CONTROL SYSTEM WITH SUBPLANT RANK GENERATOR

(71) Applicant: Johnson Controls Tyco IP Holdings LLP, Milwaukee, WI (US)

(72) Inventors: Ryan C. Beaty, Milwaukee, WI (US); Graeme Willmott, Milwaukee, WI (US); Jared W. Fread, Milwaukee, WI (US); Shawn A. Schlagenhaft, Fond du Lac, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 536 days.

This patent is subject to a terminal disclaimer.

(21) Appl. No.: 16/453,755

(22) Filed: Jun. 26, 2019

(65) Prior Publication Data

US 2020/0409756 A1    Dec. 31, 2020

(51) Int. Cl.

| G06F 9/50 | (2006.01) |
| G06F 16/9035 | (2019.01) |
| G05B 13/02 | (2006.01) |
| G06Q 10/06 | (2012.01) |
| G06Q 50/06 | (2012.01) |
| H02J 3/00 | (2006.01) |

(52) U.S. Cl.
CPC .......... *G06F 9/505* (2013.01); *G05B 13/027* (2013.01); *G06F 16/9035* (2019.01); *G06Q 10/0631* (2013.01); *G06Q 10/06312* (2013.01); *G06Q 10/06313* (2013.01); *G06Q 10/06315* (2013.01); *G06Q 50/06* (2013.01); *H02J 3/003* (2020.01); *H02J 2203/20* (2020.01)

(58) Field of Classification Search
CPC ............. G06Q 50/06; G06Q 10/06313; G06Q 10/06315; G06Q 10/06312; H02J 2203/20; H02J 3/003; H04L 12/2827
See application file for complete search history.

(56) References Cited

U.S. PATENT DOCUMENTS

| 10,175,681 B2 | 1/2019 | Wenzel et al. | |
| 2018/0024543 A1* | 1/2018 | Kitamura | ........... G06Q 10/0631 700/44 |
| 2018/0150857 A1* | 5/2018 | Lee | ........................ H02J 3/004 |
| 2018/0285800 A1 | 10/2018 | Wenzel et al. | |

(Continued)

*Primary Examiner* — Barbara B Anyan
(74) *Attorney, Agent, or Firm* — Foley & Lardner LLP

(57) ABSTRACT

A controller for a central plant having subplants operating to produce resources consumed by a building. The controller includes a processing circuit including a processor and memory storing instructions executed by the processor. The memory includes an offline rank generator that receives historical subplant allocation data and generates subplant ranks based on the historical subplant allocation data, each of the subplant ranks is associated with one of the subplants and defines a priority of each subplant with respect to production of a resource relative to other subplants that produce the resource. The memory also includes a high level optimizer that uses the subplant ranks associated with each of the subplants to determine resource allocation of the subplants according to the subplant ranks. The processing circuit is operates the subplants according to the resource allocation.

20 Claims, 12 Drawing Sheets

(56) References Cited

U.S. PATENT DOCUMENTS

| | | | |
|---|---|---|---|
| 2020/0003442 A1* | 1/2020 | Pancholi | H02J 3/00 |
| 2020/0073342 A1* | 3/2020 | Lee | G06Q 10/04 |
| 2020/0076196 A1* | 3/2020 | Lee | G05B 13/042 |
| 2020/0106294 A1* | 4/2020 | Wenzel | H02J 7/35 |
| 2020/0106385 A1* | 4/2020 | Wenzel | H02S 10/00 |
| 2020/0142364 A1* | 5/2020 | Craig | G05B 13/042 |
| 2020/0193345 A1* | 6/2020 | Elbsat | G06Q 10/06315 |
| 2020/0193346 A1* | 6/2020 | Elbsat | G06Q 50/06 |
| 2020/0193532 A1* | 6/2020 | ElBsat | G06Q 10/06315 |
| 2020/0341434 A1* | 10/2020 | Beaty | F24D 10/00 |
| 2020/0363776 A1* | 11/2020 | Burroughs | H04L 12/2827 |
| 2020/0379418 A1* | 12/2020 | Fread | G06Q 50/06 |

* cited by examiner

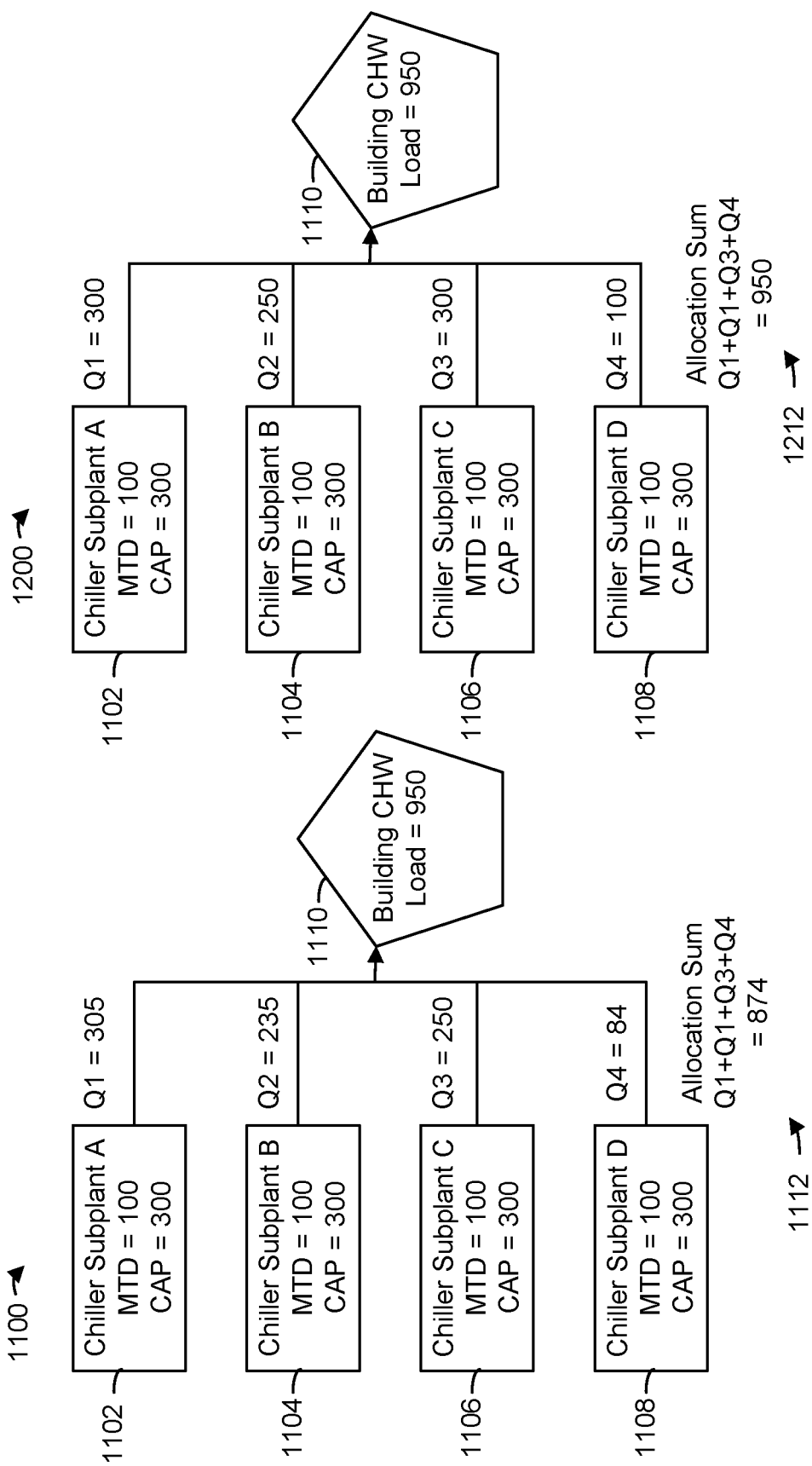

CENTRAL PLANT CONTROL SYSTEM WITH SUBPLANT RANK GENERATOR

BACKGROUND

The present disclosure relates generally to the operation of a central plant for serving building thermal energy loads. The present disclosure relates more particularly to systems and methods for optimizing the operation of one or more subplants of a central plant according to ranks.

A central plant may consume resources from a utility (e.g., electricity, water, natural gas, etc.) to heat or cool working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

In one aspect, an operating engineer of the central plant operating HVAC devices allocates resources to HVAC devices according to a preference. For example, the operating engineer utilizes an air cooled chiller at its full capacity before operating a heat recovery chiller, then operates the heat recovery chiller if additional chilled water resource is needed. However, such preference of operating the central plant may be cost inefficient. In addition, the process of configuring the central plant to operate according to the preference can be tedious and time-consuming.

SUMMARY

One implementation of the present disclosure is a controller for a central plant having subplants that operate to produce resources consumed by a building. The controller includes a processing circuit comprising a processor and memory storing instructions executed by the processor. The memory includes an offline rank generator configured to receive historical subplant allocation data and generate subplant ranks based on the historical subplant allocation data. The subplant ranks are associated with the subplants and define a priority of each subplant with respect to production of a resource relative to other subplants that produce the resource. The memory also includes a high level optimizer configured to use the subplant ranks associated with each of the subplants to determine resource allocation of the subplants according to the subplant ranks. The processing circuit is configured to operate the subplants according to the resource allocation.

In some embodiments, the offline rank generator includes an allocation rank generator configured to receive the historical subplant allocation data from the high level optimizer and determine, based on the historical subplant allocation data, the subplant ranks.

In some embodiments, the offline rank generator includes an AI rank generator configured to receive the historical subplant allocation data from the high level optimizer and building data to generate a model using the historical subplant allocation data and the building data.

In some embodiments, the model is used to generate future subplant load allocations for use in determining the subplant ranks.

In some embodiments, the model generated by the AI rank generator is a neural network.

In some embodiments, the offline rank generator includes a rank questionnaire module configured to generate a series of questions to a user associated with operational characteristics of the central plant.

In some embodiments, the rank questionnaire module is configured to receive user responses from the user to the series of questions. The user responses are used to determine the subplant ranks.

Another implementation of the present disclosure is a method of controlling a central plant having subplants that operate to produce resources consumed by a building. The method involves determining subplant ranks based on operational characteristics of the central plant. The subplant ranks are associated with the subplants and define a priority of each subplant with respect to production of a resource relative to other subplants that produce the resource. The method also involves determining resource allocation of the subplants according to the subplant ranks and operating the subplants according to the resource allocation.

In some embodiments, determining the subplant ranks based on operational data of the central plant further involves obtaining user data in response to a series of questions defining the operational characteristics of the central plant and determining the subplant ranks based on the user data.

In some embodiments, determining the subplant ranks based on operational data of the central plant further involves obtaining historical subplant load allocation data defining a historical resource allocation of the subplants from a previous prediction window and determining the subplant ranks based on the historical subplant load allocation data.

In some embodiments, determining the subplant ranks based on operational data of the central plant further involves obtaining historical subplant load allocation data define historical resource allocation of the subplants from a previous prediction window, obtaining building data, generating a model based on the historical subplant load allocation data and the building data, and determining the subplant ranks based on an output of the model.

In some embodiments, generating the model based on the historical subplant load allocation data and the building data involves generating a neural network.

Yet another implementation of the present disclosure is a controller for a central plant having subplants that operate to produce resources consumed by a building. The controller includes a processing circuit having a processor and memory storing instructions executed by the processor. The memory includes an offline rank generator configured to receive user data and generate subplant ranks based on the user data. Each of the subplant ranks is associated with one of the subplants and defines a priority of each subplant with respect to production of a resource relative to other subplants that produce the resource. The memory also includes a high level optimizer configured to use the subplant ranks associated with each of the subplants to determine resource allocation of the subplants according to the subplant ranks. The processing circuit is configured to operate the subplants according to the resource allocation.

In some embodiments, the offline rank generator includes a rank questionnaire module configured to generate a series of questions to a user associated with operational characteristics of the central plant.

In some embodiments, the rank questionnaire module is configured to receive user responses from the user to the series of questions. The user response are used to determine the operational characteristics of the central plant.

In some embodiments, the user responses to the series of questions is used to determine the subplant ranks.

In some embodiments, the offline rank generator is configured to receive historical subplant allocation data and generate the subplant ranks based on the historical subplant allocation data.

In some embodiments, the offline rank generator includes an allocation rank generator configured to receive the historical subplant allocation data from the high level optimizer and determine, based on the historical subplant allocation data, the subplant ranks.

In some embodiments, the offline rank generator includes an AI rank generator configured to receive the historical subplant allocation data from the high level optimizer and building data to generate a model using the historical subplant allocation data and the building data.

In some embodiments, the model is used to generate future subplant load allocations for use in determining the subplant ranks.

BRIEF DESCRIPTION OF THE DRAWINGS

FIG. 11 is an unadjusted allocation diagram which can be determined using a model generated by the AI rank generator of FIG. 10, according to some embodiments.

FIG. 12 is an adjusted allocation diagram which can be determined by the AI rank generator of FIG. 10, according to some embodiments.

DETAILED DESCRIPTION

Overview

Referring generally to the FIGURES, disclosed herein are systems and methods for operating the HVAC system based on ranks.

Various embodiments of a system, a method, and a non-transitory computer readable medium for operating an energy plant based on ranks are disclosed herein. In one aspect, the system obtains rank identifiers indicating ranks of a plurality of heat, ventilation, and air conditioning (HVAC) devices of the energy plant. The ranks may be predetermined, determined by a user (e.g., operating engineer), or automatically assigned. In one aspect, the system determines resource allocation of the plurality of HVAC devices according to the ranks of the plurality of HVAC devices, and determines a set of operating parameters of the plurality of HVAC devices based on the determined resource allocation. The system may operate the plurality of HVAC devices according to the set of operating parameters.

Advantageously, the disclosed system and method enable detection of patterns of ranks or priorities of HVAC devices. In one aspect, HVAC devices operated by an operating engineer according to his/her preference on priorities of HVAC devices may be cost inefficient. Moreover, an operating engineer may not be aware of such preference on the priorities of HVAC devices. The disclosed system and method enable detection of any patterns of ranks or priorities of HVAC devices from prior resource consumption, and modification of ranks of HVAC devices to improve operating efficiency.

Building and HVAC System

Figure 1:
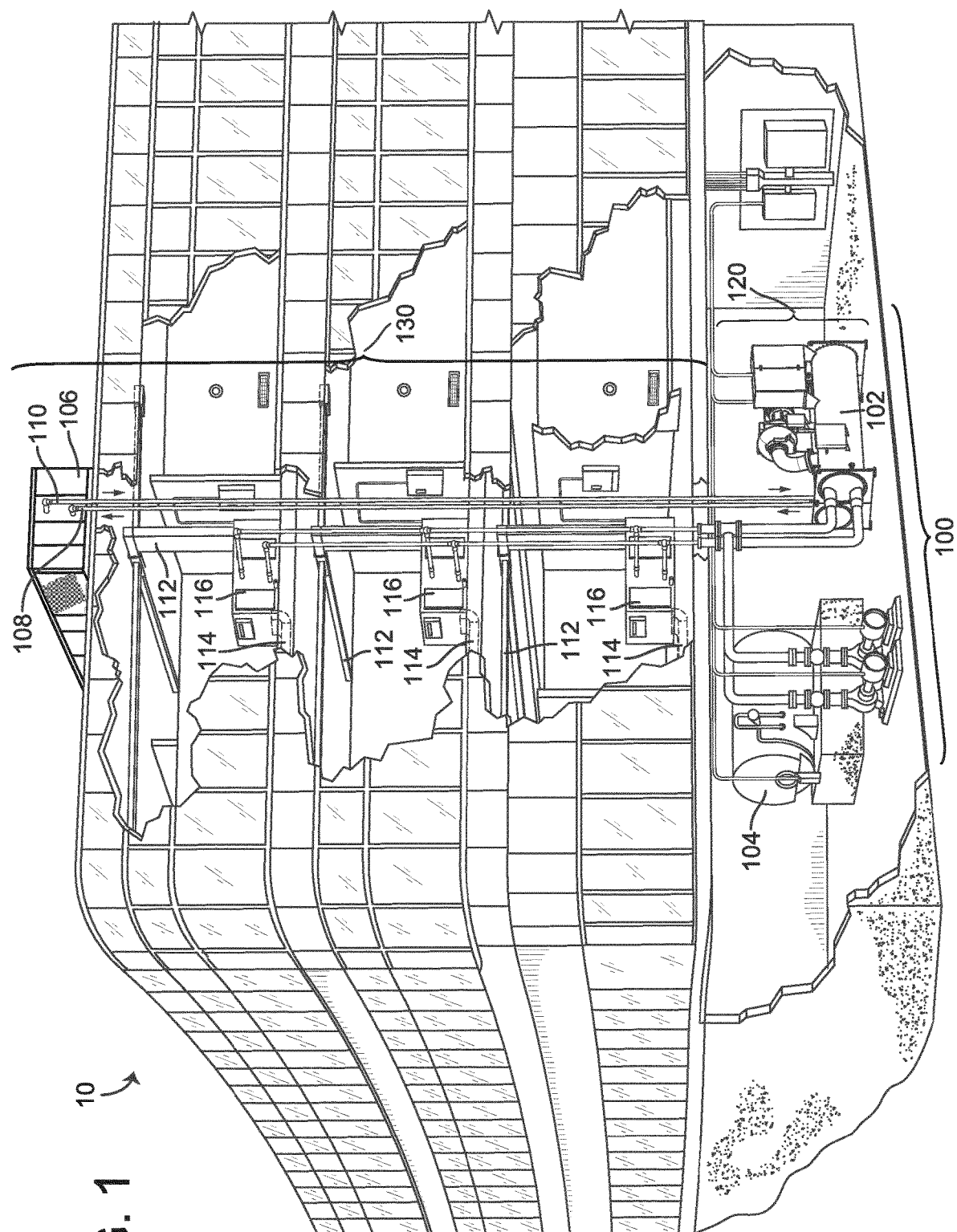
FIG. 1 is a drawing of a building equipped with an HVAC system, according to some embodiments.
Figure 2:
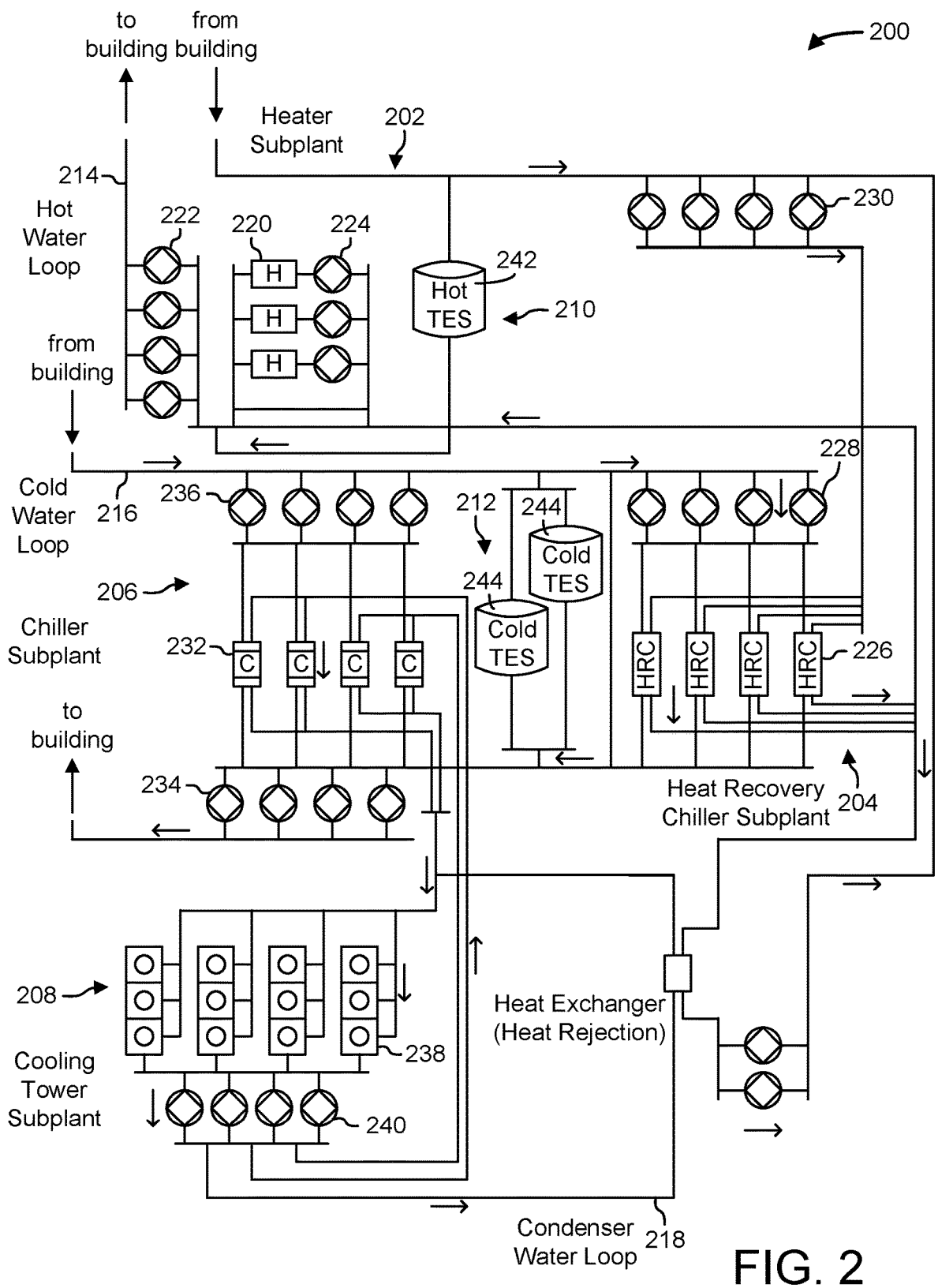
FIG. 2 is a schematic of a waterside system, which can be used as part of the HVAC system of FIG. 1, according to some embodiments.
Figure 3:
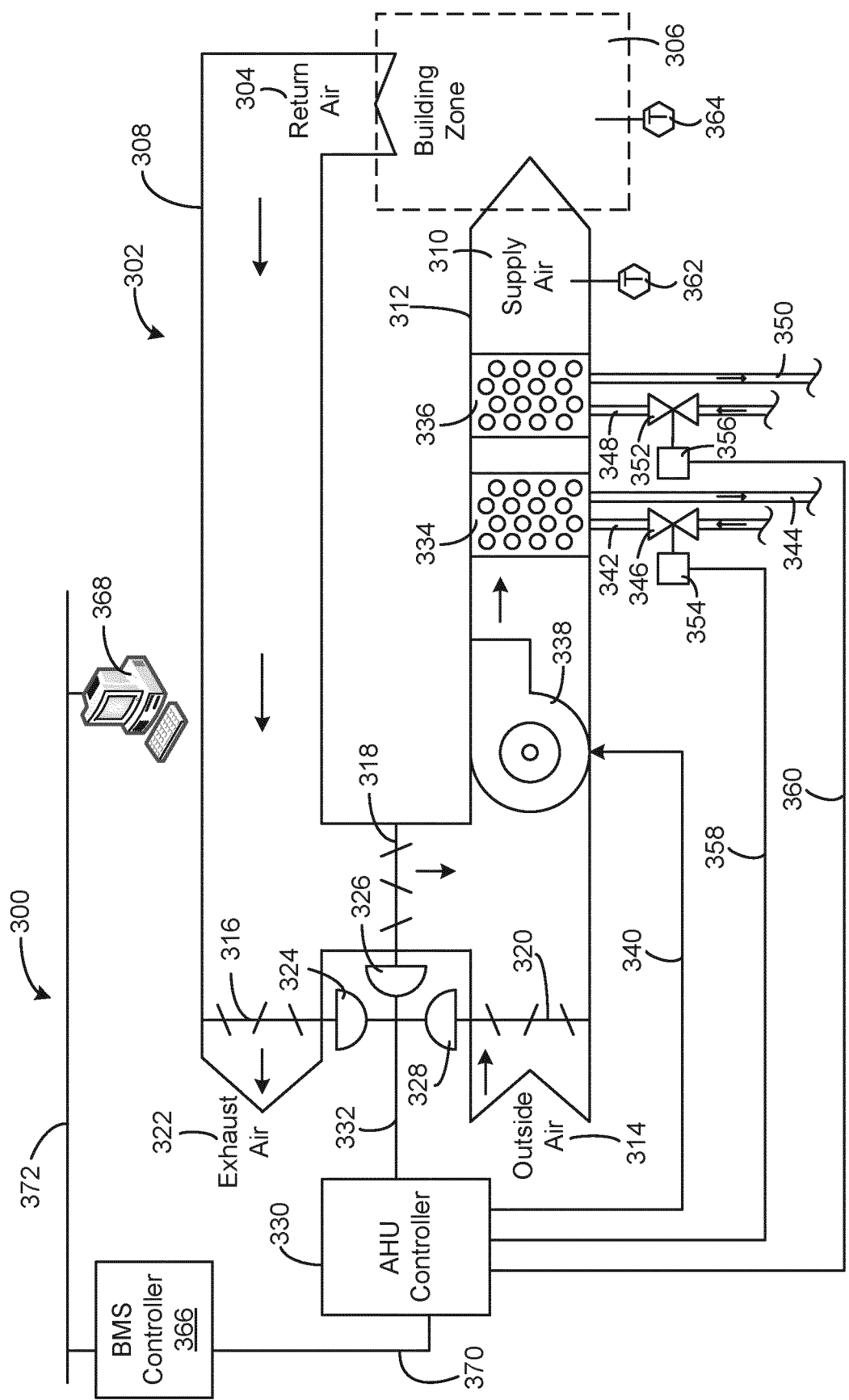
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
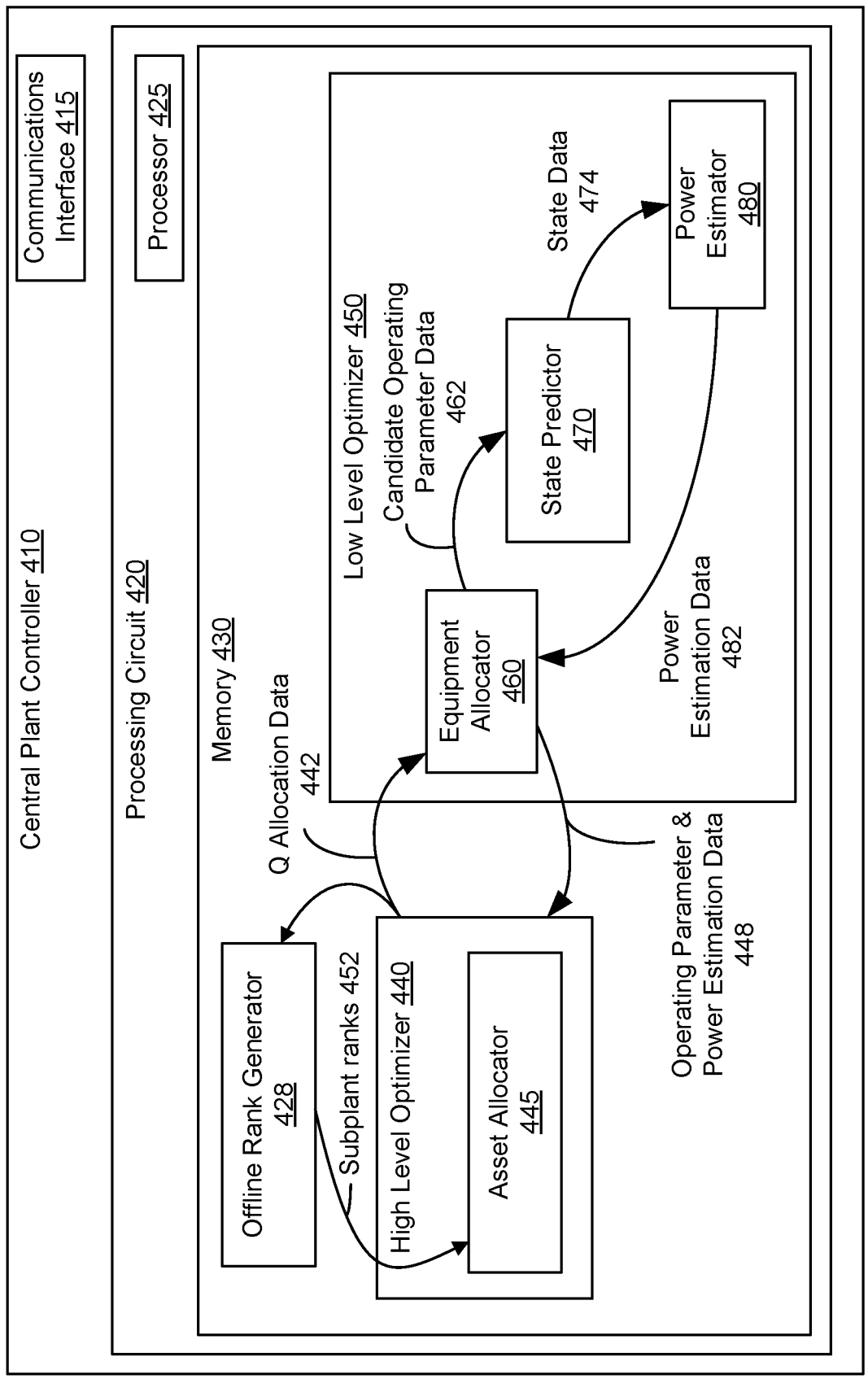
FIG. 4 is a block diagram of a central plant controller which can be used to control the HVAC system of FIG. 1, the waterside system of FIG. 2, and/or the airside system of FIG. 3, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. In some embodiments, the central plant controller 410 monitors and controls subplants of the waterside system 200 of FIG. 2. The central plant controller 410 may be the AHU controller 330 of FIG. 3, or a combination of the BMS controller 366 and the AHU controller 330 of FIG. 3. In one configuration, the central plant controller 410 includes a communications interface 415 and a processing circuit 420. These components operate together to determine a set of operating parameters for operating various HVAC devices of the HVAC system 100 (or subplants within a central plant). In some embodiments, the central plant controller 410 includes additional, fewer, or different components than shown in FIG. 4.

The communications interface 415 facilitates communication of the central plant controller 410 with other HVAC devices (e.g., heaters, chillers, air handling units, pumps, fans, thermal energy storage, etc.) or subplants within a central plant. The communications interface 415 can be or include wired or wireless communications interfaces (e.g., jacks, antennas, transmitters, receivers, transceivers, wire terminals, etc.). In various embodiments, communications via the communications interface 415 can be direct (e.g., local wired or wireless communications) or via a communications network (e.g., a WAN, the Internet, a cellular network, etc.). For example, the communications interface 415 can include an Ethernet/USB/RS232/RS485 card and port for sending and receiving data through a network. In another example, the communications interface 415 can include a Wi-Fi transceiver for communicating via a wireless communications network. In another example, the communications interface 415 can include cellular or mobile phone communication transceivers.

The processing circuit 420 is a hardware circuit executing instructions to determine a set of parameters for operating HVAC devices of the HVAC system 100 (or subplants within a central plant). In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including an offline rank generator 428, a high level optimizer 440 and a low level optimizer 450. The offline rank generator 428 may determine subplant ranks 452 of the plurality of subplants of the energy plant, where the subplant ranks 452 indicate a priority of each subplant with respect to production of a resource relative to other subplants that produce the resource. In some embodiments, offline rank generator 428 provides the subplant ranks 452 to high level optimizer 440. The high level optimizer 440 may determine how to distribute resources (e.g., thermal energy loads) across subplants (e.g., chillers, heaters, valves, etc.) for each time step in the prediction window, for example, to minimize the cost of energy consumed by the subplants according to the ranks. The low level optimizer 450 may determine how to operate each subplant according to the resources (e.g., thermal energy loads) determined by the high level optimizer 440. In other embodiments, the processor 425 and the memory 430 may be omitted, and the offline rank generator 428, the high level optimizer 440, and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

Memory 430 is also shown to include an offline rank generator 428 configured to generate subplant ranks for each subplant included in a central using user input and/or central plant data for use by high level optimizer 440, according to some embodiments. In some embodiments, offline rank generator 428 is configured to administer a series of questions to a user associated with the operating procedures of the central plant. In some such embodiments, offline rank generator uses the user responses to each of the questions in the series of questions in order to determine subplant ranks. In some embodiments, offline rank generator 428 is configured to determine subplant ranks based on previous subplant allocations. For example, offline rank generator 428 may receive historical subplant allocations determined by a previous high level optimization process and generates subplant ranks based on the historical subplant allocations. In some embodiments, offline rank generator 428 is configured to receive building environmental data (e.g., temperature, relative humidity, time of day, etc.) and historical subplant allocations to generate a model (e.g., a trained neural network model, etc.) of the subplant allocations. Each of these features will be described in greater detail below in reference to FIGS. 5-12.

The offline rank generator 428 is a component that generates rank identifiers indicating ranks of subplants. In one aspect, the subplants are operated according to a preference of an operating engineer or subplant ranks. The subplant ranks may be time dependent. For example, during a first time period (e.g., weekday), a first subplant supplying or consuming a first type of resource is prioritized over a second subplant supplying or consuming a second type of resource, and, during a second time period (e.g., weekend), the second subplant is prioritized over the first subplant. Resources may be consumed or allocated to a device with a higher priority (e.g., lower rank). If there is any remaining resource to be consumed or allocated, the remaining resource may be consumed or allocated to a device with a subsequent subplant rank.

In one approach, the ranks of subplants are manually determined by a person or an operating engineer. The offline rank generator 428 may generate and present a user interface allowing a user to specify ranks of a priority of each subplant with respect to production of a resource relative to other subplants that produce the resource. The user interface may allow a user to input time varying ranks for different subplants. According to input received through the user interface, the offline rank generator 428 may generate rank identifiers indicating the ranks and store the rank identifiers.

In one approach, the offline rank generator 428 automatically determines ranks of subplants. The offline rank generator 428 may analyze the prior resource consumption and detect a pattern of different priorities assigned to the subplants based on the prior resource consumption. In one approach, the offline rank generator 428 obtains resource consumption data indicating prior resource consumption of the subplants, for example, operated by an operating engineer, by the central plant controller 410, or by any component. The offline rank generator 428 may automatically determine ranks of the subplants conforming to the prior resource consumption. In some embodiments, the offline rank generator 428 obtains resource allocation or consumption for multiple time periods, and for each time period, determines ranks of the subplants. The offline rank generator 428 may generate rank identifiers indicating the ranks and store the rank identifiers.

In one implementation, the high level optimizer 440 determines resources (e.g., thermal energy loads) of HVAC devices of the HVAC system 100 (or subplants within a central plant), and generates the Q allocation data 442 indicating the determined resources. The high level optimizer 440 may provide the Q allocation data 442 to the low level optimizer 450. In return, the high level optimizer 440 may receive, from the low level optimizer 450, operating parameter and power estimation data 448 indicating a set of operating parameters to operate HVAC devices of the HVAC system 100 (or subplants within a central plant), predicted power consumptions when operating the HVAC system 100 according to the set of operating parameters, or both. Based on the operating parameter and power estimation data 448, the high level optimizer 440 can operate the HVAC system 100 accordingly or generate different Q allocation data 442 for further optimization. The high level optimizer 440 and the low level optimizer 450 may operate together online in real time, or offline at different times.

In one or more embodiments, the high level optimizer 440 includes an asset allocator 445. The asset allocator 445 may operate to distribute or allocate resources (e.g., distribute thermal energy load) according to the ranks of the subplants indicated by the rank identifiers. In one aspect, ranks indicate which subplant to produce a particular resource when there are multiple different subplants that produce that resource. For example, a chiller subplant and a heat recovery chiller can both produce chilled water or cold thermal energy, and one of the chiller subplant and the heat recovery chiller with a lower rank can produce the chilled water or the cold thermal energy first. In some embodiments, the high level optimizer 440 includes additional, fewer, or different components than shown in FIG. 4.

The asset allocator 445 determines a distribution of thermal energy loads of the HVAC devices of the HVAC system 100 (or subplants within a central plant) based on rank identifiers. In some embodiments, the asset allocator 445 prioritizes resource allocations to subplants associated with lower ranks over subplants associated with higher ranks. In one aspect, given predicted resources (e.g., thermal energy load) and utility rate information received through a user input or automatically determined by a scheduler, the asset allocator 445 may determine a distribution of resources (e.g., thermal energy load) according to the ranks of the subplants. For example, the asset allocator 445 allocates resources to a subplant having a lower rank than another subplant, and allocates a part or all of the remaining resources to the other subplant. In some embodiments, the asset allocator 445 changes or adjusts ranks of the subplants to minimize resource consumption or operation cost of the central plant. The asset allocator 445 may generate the Q allocation data 442 indicating the allocated resources of different subplants within the central plant and provide the Q allocation data 442 to the low level optimizer 450.

In some embodiments, the asset allocator 445 determines resource allocation according to dependencies of resources. In one aspect, the asset allocator 445 classifies, for each subplant, each resource produced or consumed by the subplant as either an independent resource or a dependent resource. An independent resource is a resource with an amount that is controllable, for example, as a decision variable for operating a central plant, where a dependent resource is a resource with an amount depending on an amount of one or more independent resources or dependent resources. The asset allocator 445 may classify a resource produced or consumed by a subplant as an independent resource based on schematic connections of the subplants, ranks, or a combination of them. In some examples, certain resources are predetermined as independent resources. If a subplant produces or consumes a first resource and a second resource, the first resource may be an independent resource that is controllable as a decision variable for operating a central plant, and the second resource may be a dependent resource depending on the amount of resource allocated to the first resource.

In some embodiments, the asset allocator 445 determines resource allocation among subplants that produce or consume independent resources, then determines resource allocation among subplants that produce or consume dependent resources. In one approach, the asset allocator 445 determines resource allocation among subplants that produce or consume independent resources according to the ranks (for example, from lowest rank to highest rank). The asset allocator 445 may relax constraints of resource allocation among subplants that produce or consume dependent resources, then determine resource allocation among subplants that produce or consume independent resources according to the relaxed constraints. For example, the asset allocator 445 may set resource allocation among subplants that produce or consume dependent resources as minimum values, then determine resource allocation among subplants that produce or consume independent resources, for example, in a sequence from the lowest rank to the highest rank. After determining resource allocation among subplants that produce or consume independent resources, the asset allocator 445 may determine resource allocation among subplants that produce or consume dependent resources according to the determined resource allocation of independent resources and the ranks (from lowest rank to highest rank). The asset allocator 445 may determine whether all resources satisfy corresponding target constraints or are successfully allocated to subplants. If not all resources are allocated to subplants, the asset allocator 445 may iteratively modify resource allocation among subplants that produce or consume independent resources and resource allocation among subplants that produce or consume dependent resources, until all resources are allocated to subplants. If all resources are allocated to subplants, the asset allocator 445 may generate the Q allocation data 442 specifying the allocated resources, and provide the Q allocation data 442 to the low level optimizer 450.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," and U.S. patent application Ser. No. 15/473,496 filed Mar. 29, 2017 and titled "Central Plant With Asset Allocator," which are incorporated by reference herein.

The low level optimizer 450 receives the Q allocation data 442 from the high level optimizer 440, and determines operating parameters (e.g., capacities) of the HVAC devices of the HVAC system 100 (or subplants within a central plant). In one or more embodiments, the low level optimizer 450 includes an equipment allocator 460, a state predictor 470, and a power estimator 480. Together, these components operate to determine a set of operating parameters, for example, rendering reduced power consumption of the HVAC system 100 for a given set of resources (e.g., thermal energy loads) indicated by the Q allocation data 442, and generate operating parameter data indicating the determined set of operating parameters. In some embodiments, the low level optimizer 450 includes different, more, or fewer components, or includes components in different arrangements than shown in FIG. 4.

In one configuration, the equipment allocator 460 receives the Q allocation data 442 from the high level optimizer 440, and generates candidate operating parameter data 462 indicating a set of candidate operating parameters of HVAC devices of the HVAC system 100 (or subplants within a central plant) according to resource allocation specified by the Q allocation data 442. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the power estimator 480. The power estimator 480 predicts, based on the state data 474, total power consumed by the HVAC system 100 operating according to the set of candidate operating parameters, and generates the power estimation data 482 indicating the predicted power consumption. The equipment allocator 460 may repeat the process with different sets of candidate operating parameters to obtain predicted power consumptions of the HVAC system 100 operating according to different sets of candidate operating parameters, and select a set of operating parameters rendering lower power consumption. The equipment allocator 460 may generate the operating parameter and power estimation data 448 indicating (i) the selected set of operating parameters and (ii) predicted power consumption of the power plant when operating according to the selected set of operating parameters, and provide the operating parameter and power estimation data 448 to the high level optimizer 440.

Memory 430 is also shown to include an offline rank generator 428 configured to generate subplant ranks for each subplant included in a central using user input and/or central plant data for use by high level optimizer 440, according to some embodiments. In some embodiments, offline rank generator 428 is configured to administer a series of questions to a user associated with the operating procedures of the central plant. In some such embodiments, offline rank generator uses the user responses to each of the questions in the series of questions in order to determine subplant ranks. In some embodiments, offline rank generator 428 is configured to determine subplant ranks based on previous subplant allocations. For example, offline rank generator 428 may receive historical subplant allocations determined by a previous high level optimization process and generates subplant ranks based on the historical subplant allocations. In some embodiments, offline rank generator 428 is configured to receive building environmental data (e.g., temperature, relative humidity, time of day, etc.) and historical subplant allocations to generate a model (e.g., a trained neural network model, etc.) of the subplant allocations. Each of these features will be described in greater detail below in reference to FIGS. 5-12.

Offline Rank Generator

Figure 5:
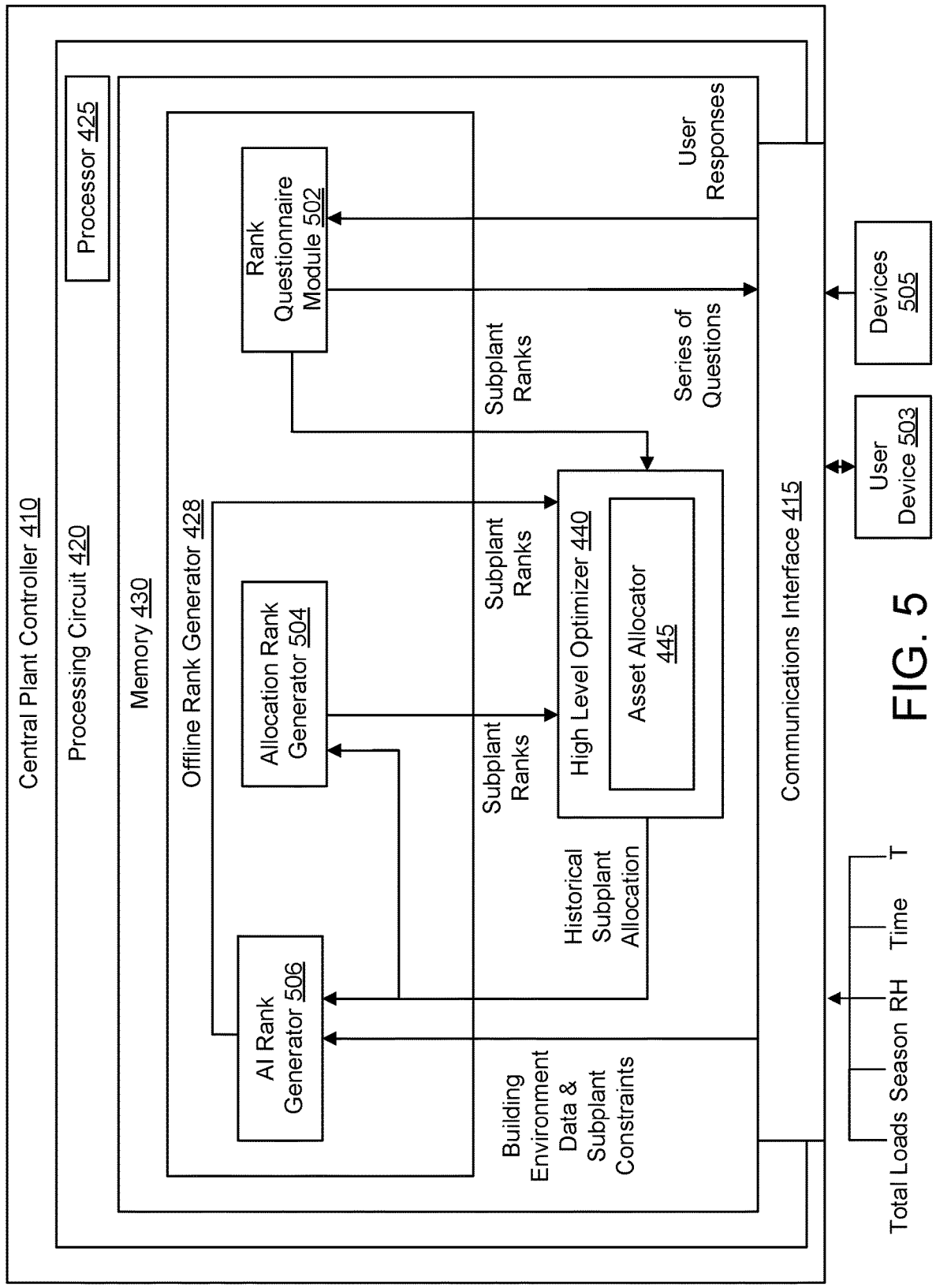
FIG. 5 is a block diagram illustrating an offline rank generator included in the central plant control of FIG. 4 which can be used to generate subplant, according to some embodiments.

Referring now to FIG. 5, a block diagram illustrating the offline rank generator 428 and modules included therein as implemented in central plant controller 410 is shown, according to some embodiments. Offline rank generator 428 is shown to include a rank questionnaire module 502, an allocation rank generator 504, and an AI rank generator 506 each configured to generate a subplant rank for each subplant included in the central plant which central plant controller 410 controls, according to some embodiments. It should be understood that the embodiment of offline rank generator 428 including rank questionnaire module 502, allocation rank generator 504, and AI rank generator 506 illustrated in FIG. 5 is not intended to be limiting. Offline rank generator 428 may include any combination of rank questionnaire module 502, allocation rank generator 504, and AI rank generator 506 for use in determining subplant ranks. For example, offline rank generator 428 may only include AI rank generator 506 in order to generate subplant ranks. In another example, offline rank generator 428 may include rank questionnaire module 502 and allocation rank generator 504 in order to generate subplant ranks.

Rank questionnaire module 502 is shown to communicate with a user device 503 via communications interface 415, according to some embodiments. In some embodiments, rank questionnaire module 502 is configured to administer a series of questions relating to operational procedures, preferences, trends, etc. of the central plant to a user associated with user device 503. In some embodiments, a user provides a user response to each question to rank questionnaire module 502 via communications interface 415 using user device 503. In some embodiments, rank questionnaire module 502 uses the user responses in order to extract operational data relating to the operational preferences of the central plant. In some embodiments, the rank questionnaire module 502 uses the extracted operational data to determine a subplant rank for each subplant in a central plant.

In some embodiments, the rank questionnaire module 502 generates and presents a user interface via communications interface 415 allowing a user to answer the series of questions with respect to the operating conditions of the central plant. In some embodiments, the rank questionnaire module 502 is accessed via user device 503. User device 503 may be any device configured to facilitate communication between a user of user device 503 and central plant controller 410. For example, user device 503 may be a computer, a terminal, a mobile device, a control panel in communication with central plant controller 410 via communications interface 415. In some embodiments, the questions included in the series of questions are dynamically generated based on answers provided by the user to previous questions. For example, subsequent questions following a question requesting the user to identify the type of subplant (e.g., chiller subplant, cooling tower subplant, etc.) may depend the type of subplant the user inputs. As a result of identifying the type of subplant as a chiller subplant in the previous question, the next question administered may ask the user to identify a number of subplant devices included in the chiller subplant. In some embodiments, the order of questions begins with general questions (e.g., questions about the plant as a whole) and proceeds to specific questions (e.g., questions about individual devices that make up each subplant included in the plant). For example, a first question may ask the user if the plant is operated differently depending on season (e.g., spring, summer, fall, winter) while the last question may ask the user to identify which device (e.g., a chiller) is loaded first during a particular time period for a particular subplant (e.g., a chiller subplant).

Still referring to FIG. 5, offline rank generator 428 is shown to include an allocation rank generator 504 configured to analyze historical subplant allocations to determine a subplant rank for each subplant included in a central plant based on the historical subplant allocations, according to some embodiments. In some embodiments, allocation rank generator 504 receives historical subplant allocations from high level optimizer 440. In some embodiments, the historical subplant allocation received by allocation rank generator 504 includes time-series data as determined by a previous high level optimization process. In some embodiments, allocation rank generator 504 receives device data including equipment dispatch data, setpoint data, power consumption data, etc. for the one or more devices included in each subplant from equipment allocator 460. In some such embodiments, allocation rank generator 504 analyzes the device data in order to determine a device rank for each device included in each subplant for use in a low level optimization process.

Offline rank generator 428 is also shown to include an AI rank generator 506 configured to receive building environment data, historical subplant allocations, and/or subplant constraints to generate a trained model of subplant allocations. In some embodiments, the building environment data consists of total loads, season (e.g., time of year), relative humidity RH, time and temperature of one or more spaces T. In some embodiments, the AI rank generator 506 is in communication with devices 505 via communications interface 415 in order to collect one or more subplant constraints (e.g., maximum capacity to produce a resource, minimum turndown value of the subplant, etc.). In some such embodiments, devices 505 includes one or more subplants and/or devices included in the one or more subplants that are controlled by central plant controller 410. In some embodiments, the trained model generated by AI rank generator 506 is a train neural network model. In some embodiments, the trained model generated by AI rank generator 506 is used to determine a subplant rank for each subplant included in a central plant. The subplant ranks generated by AI rank generator 506 may be transmitted to high level optimizer 440 for use in a high level optimization process to determine subplant allocations. In some embodiments, AI rank generator 506 uses the generated model to determine subplant allocations for use by low level optimizer 450 in a low level optimization process.

Determining Subplant Ranks Using User Input

Figure 6:
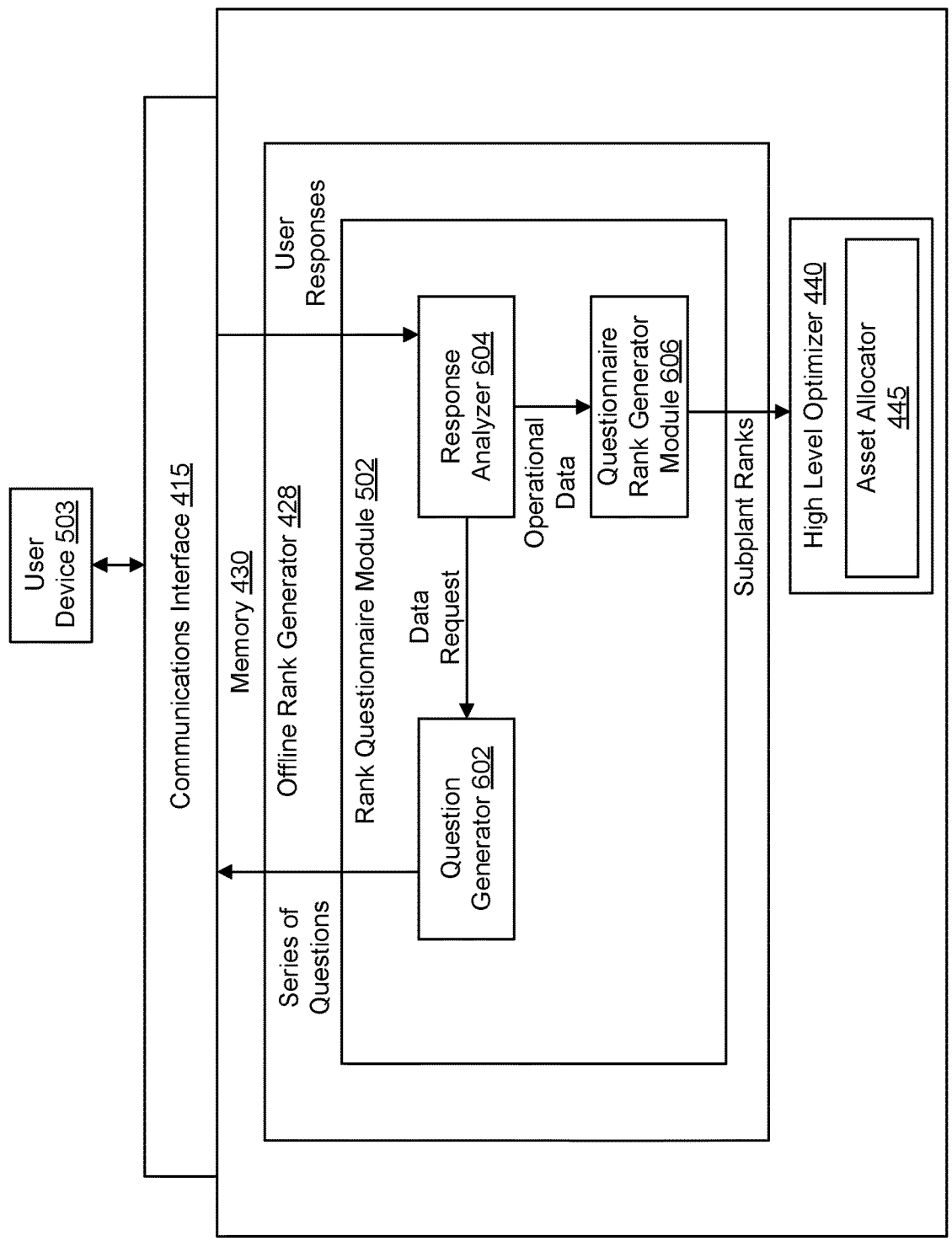
FIG. 6 is a block diagram illustrating a rank questionnaire module included in the offline rank generator of FIG. 5, according to some embodiments.

Referring now to FIG. 6, a block diagram illustrating the rank questionnaire module 502 and modules included therein is shown, according to some embodiments. As previously understood, rank questionnaire module 502 is configured to administer a series of questions associated with operational preferences of the central plant to a user. The rank questionnaire module 502 is configured to receive user responses from a user. In some embodiments, a user is an operator of the central plant in which the central plant controller 410 is implemented. In some embodiments, the rank questionnaire module 502 analyzes the user responses to extract operational data of the subplants included in the central plant.

Rank questionnaire module 502 is shown to include a question generator 602 configured to administer a series of questions to a user. In some embodiments, the question generator 602 administers the series of questions to the user via communications interface 415. In some embodiments, the question generator 602 is configured to dynamically generate questions based on a user response to a previous question. In some embodiments, as will be described in greater detail with reference to FIG. 7, question generator 602 receives a data request indicating that more operational data is needed for a response analyzer 604 to fully define the operation of a central plant. In some embodiments, question generator 602 administers a question to user when a data request is received from response analyzer 604.

Response analyzer 604 is shown to receive one or more user responses entered by a user in response to a question administered by question generator 602, according to some embodiments. In some embodiments, response analyzer 604 receives the user responses from a user via communications interface 415. In some embodiments, as will be described in greater detail with reference to FIG. 7, response analyzer 604 is configured to analyze each user response and extract operational data associated with the user response. Response analyzer 604 is configured to output the operational data extracted from each user response to a questionnaire rank generator module 606 for use in determining a subplant rank based on the user responses for each subplant included in a central plant. Response analyzer 604 is also shown to output a data request to question generator 602, according to some embodiments. In some embodiments, the data request is a signal transmitted to question generator 602 indicating additional operational data is needed to fully define the operational characteristics of each subplant included in the central plant. In some embodiments, the data request transmitted from to question generator 602 indicates what data and/or information is needed by response analyzer 604. In some such embodiments, question generator 602 administers a question corresponding to the data request. For example, response analyzer 604 may receive a user response to a previous question indicating that a central plant includes three subplants. The response analyzer 604 may transmit a data request to question generator indicating that the type of subplants is needed to fully define the operation of the central plant. As a result, question generator 602 may administer a question asking the user to identify a type of subplant for each of the three subplants included in the previous user response.

Figure 7:
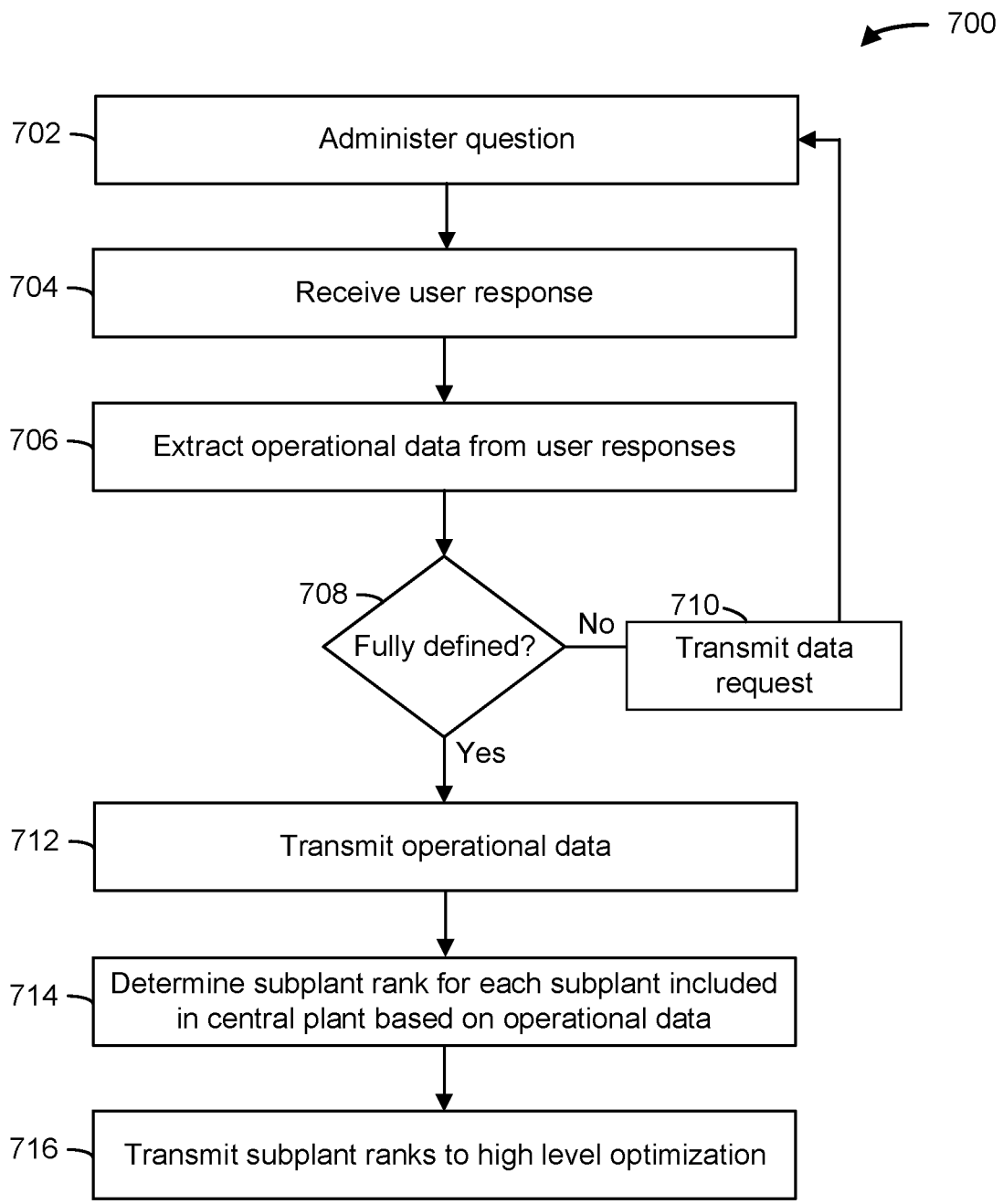
FIG. 7 is a flowchart illustrating a process of administering a series of questions and using user responses to the series of questions to generate subplant ranks, according to some embodiments.

Referring now to FIG. 7, a process 700 for administering a questionnaire to a user to collect operational data associated with the subplants included in a central plant and determining a subplant rank for each of the subplants included in the central plant based on the operational data is shown, according to some embodiments. The process 700 can be performed by rank questionnaire module 502 and components included therein, according to some embodiments. Process 700 can be continuously and/or occasionally performed to update subplant ranks. For example, process 700 may be performed every hour to update subplant ranks.

The process 700 is shown to include administering a question relating to the operational characteristics, preferences, etc. of the central plant (step 702), according to some embodiments. As will be described in greater detail with reference to FIG. 8, a specific question administered in step 702 may depend on the history one or more previous questions administered in a question series. For example, a question at the beginning of a question series may inquire about broad operational characteristics of the central plant operation (e.g., how many subplants are included in the central plant) while a question administered later in the question series may ask about operational characteristics of individual devices that make up each subplant in the central plant. In some embodiments, step 702 is performed by question generator 602.

Process 700 is shown to include receiving a user response to the question administered in step 702 (step 704), according to some embodiments. In some embodiments, the user response received in step 704 contains operational data and/or characteristics. For example, a response in step 704 may include an order of operational preference of the devices included in a subplant. In some embodiments, step 704 is performed by response analyzer 604. Process 700 is also shown to involve extracting operational data from the user responses received in step 704 (step 706). For example, in response to a question inquiring about the central plant operating differently based on time of day, a user may respond with a response indicating which subplants are prioritized based on time of day. As a result, the operational data extracted from the user response may include the operational preferences of subplants based on time of day. In some embodiments, step 706 includes extracting operational data of each subplant and/or the devices included in each subplant in order fully define how the user prefers to operate the central plant, each subplant, and/or each device included in each subplant.

Process 700 is shown to include deciding if the operational data for each subplant and/or each device included in each subplant of a central plant fully defines each subplant and/or device (step 708). In some embodiments, each subplant included in a central plant is considered fully defined when the response analyzer 604 receives operational characteristics for each subplant to define operational preferences for each subplant over a time period defined by a prediction window. For example, a central plant including a first chiller subplant and a second chiller subplant may be considered fully defined by the rank questionnaire module 502 when the rank questionnaire is able to determine the order of operational preferences (e.g., allocating a load to the first chiller subplant first during one or more particular time steps of the prediction window).

When it is determined that the operation of each subplant is not fully defined, process 700 is shown to involve transmitting a data request indicating more information is needed from a user to define the operation of each subplant (step 710), according to some embodiments. In some embodiments, step 710 involves response analyzer 604 transmitting the data request to question generator 602. In some embodiments, step 710 involves transmitting a data request indicating a specific type of data needed from a user. For example, the data request may indicate that the type of one or more subplants is needed to be identified by the user based on a previous response to a question. In some embodiments, process 700 involves performing step 702 after the data request is transmitted in step 710.

When it is determined that operation of each subplant is fully defined, process 700 is shown to involve transmitting the operational data (step 712), according to some embodiments. In some embodiments, step 712 involves response analyzer 604 transmitting the operational data to questionnaire rank generator module 606.

Process 700 is shown to involve the determining a subplant rank for each subplant included in a central plant (step 714), according to some embodiments. In some embodiments, step 714 involves determining subplant ranks for each subplant based on the transmitted operational data. In some embodiments, step 714 involves determining a subplant rank for each subplant included in a central plant for each time step in a prediction window. In some embodiments, step 714 is performed by questionnaire rank generator module 606.

Process 700 is shown to involve transmitting the subplant ranks for use in high level optimization processes (step 716), according to some embodiments. In some embodiments, step 716 involves questionnaire rank generator module 606 transmitting the subplant ranks to high level optimizer 440.

Figure 8:
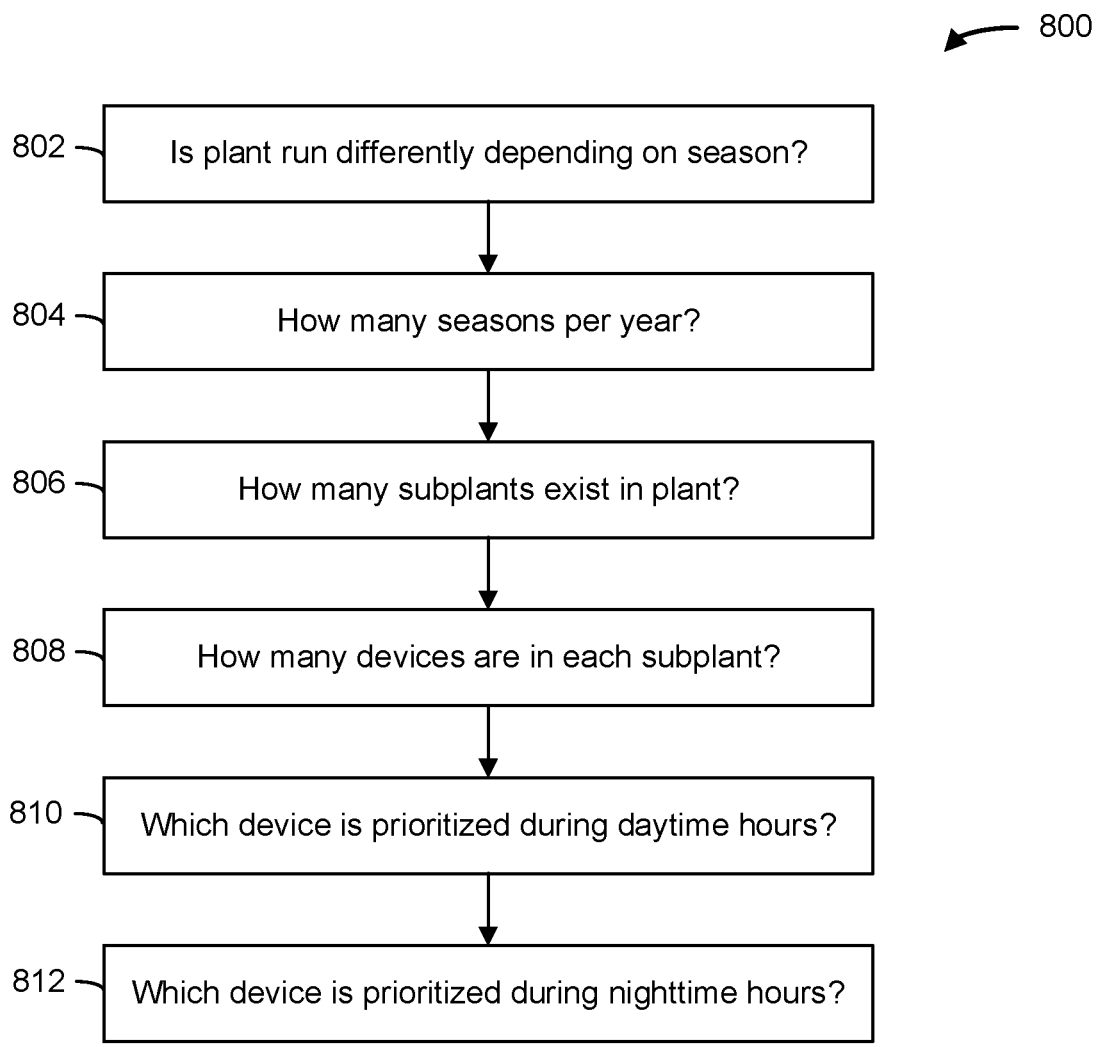
FIG. 8 is a flowchart illustrating a series of questions that can be administered as part of the process illustrated in FIG. 7, according to some embodiments.

Referring now to FIG. 8, a flowchart illustrating a series of questions 800 as can be administered to a user is shown, according to some embodiments. In some embodiments, the series of questions 800 is administered to a user by rank questionnaire module 502 while performing process 700. More specifically, in some embodiments, each question included in the series of questions 800 can administered to the user at step 702 of process 700 and the user response to each of the questions included in the series of questions 800 can be received at step 704.

The content and order of each question within the series of questions 800 presented in the embodiment illustrated in FIG. 8 is not intended to be limiting. The content and order of each question within the series of questions 800 may be configurable depending on operator and/or user preference. As previously understood, in some embodiments, the series of questions 800 may begin by presenting general questions associated with the central plant as a whole and end with specific questions associated with the individual devices. Question 802 is shown to ask the user if the plant is run differently depending on a season, according to some embodiments. For example, a user may answer "yes" to question 802 if the plant operates with free cooling during a colder season (e.g., fall, winter) and operates a chiller during a warmer season (e.g., spring, summer). The response to question 802 impacts the subsequent questions presented and/or order of subsequent questions presented to the user, according to some embodiments.

Following a response of "yes" to question 802, the series of questions 800 proceeds with question 804 relating to clarification of the seasons, according to some embodiments. At question 804, the user is asked to identify the number of seasons in a year as observed by the operation of the plant, according to an exemplary embodiment. In some embodiments, the number of seasons identified is the number of seasons that affect the operation of the plant. For example, a user of a plant that operates similarly in spring and summer but differently in the fall may provide a response of "two" to question 804 due to the two different operations of the plant. In some embodiments, question 804 involves asking the user to identify specific date ranges in year for which the one or more seasons are observed. For example, a user may identify a "warm" season operation running from April 1-September 30 and a "cold" season operation running from October 1-March 31.

In some embodiments, the responses to questions 802 and 804 allow rank questionnaire module 502 to determine if more than one set of subplant ranks is required depending on the seasonal operation. For example, if a user identifies that the central plant observes two seasons in question 804, then rank questionnaire module 502 determines that two sets of subplant ranks are to be generated (i.e., a first set of subplant ranks for the first season and a second set of subplant ranks for the second season).

The series of questions 800 begins to ask questions relating to subplant specifics at question 806, according to some embodiments. In some embodiments, at question 806, the user is asked to identify how many subplants exist in the central plant. In some embodiments, the question is asked for the user to identify a number of similar subplants. For example, a central plant having two chiller subplants would be identified as two separate subplants. In some embodiments, the response to question 806 is used by the rank questionnaire module 502 to determine the number of subplant ranks are to be generated. For example, if a user responds to question 806 with an answer of "three subplants," then rank questionnaire module 502 may determine that the subplant ranks will range from a value of one to a value of three based on the central plant having three subplants. In some embodiments, question 806 involves asking the user to identify a name for each subplant. For example, in response to question 806, a user may identify "chiller subplant A" and "chiller subplant B."

Question 808 asks the user to identify the number of devices included in each subplant, according to an exemplary embodiment. In some embodiments, question 808 involves asking the user to identify a name for each device included in each subplant. In some embodiments, question 808 is repeated based on the number of subplants identified in question 806. For example, if a user identifies "two subplants" as a response to question 806, then question 808 may repeat twice (i.e., a first occurrence asking the user to identify the number of devices included in a first subplant and a second occurrence asking the user to identify the number of devices included in a second subplant).

At question 810, the user is asked to input the order of daytime operational prioritization for each device identified in question 808 for each subplant identified in question 806. For example, a user may identify that, for a chiller subplant consisting of a first chiller device and a second chiller device, the first chiller device is prioritized first for operation during daytime hours. In some embodiments, question 810 asks the user to list in order the devices that are loaded up. For example, a user may identify that, for a chiller subplant consisting of a first chiller device and a second chiller device, the first chiller device is loaded up first and the second chiller device is loaded up second. In some embodiments, question 810 allows the user to customize the time period for which the user considers daytime hours. For example, a user may identify that the daytime hours observed by the central plant includes the hours of 7:00 am-7:00 pm.

At question 812, the user is asked to input the order of nighttime operation prioritization for each device identified in question 808 for each subplant identified in question 806. For example, a user may identify that, for a chiller subplant consisting of a first chiller and a second chiller device, the second chiller device is prioritized first for operation during nighttime hours. In some embodiments, question 812 asks the user to list in order the devices that are loaded up. For example, a user may identify that, for a chiller subplant consisting of a first chiller device and a second chiller device, the second chiller device is loaded up first and the second chiller device is loaded up second. In some embodiments, question 812 allows the user to customize the time period for which the user considers nighttime hours. For example, a user may identify that the nighttime hours observed by the central plant includes the hours of 7:00 pm-7:00 am.

Determining Subplant Ranks Based on Historical Allocations

Figure 9:
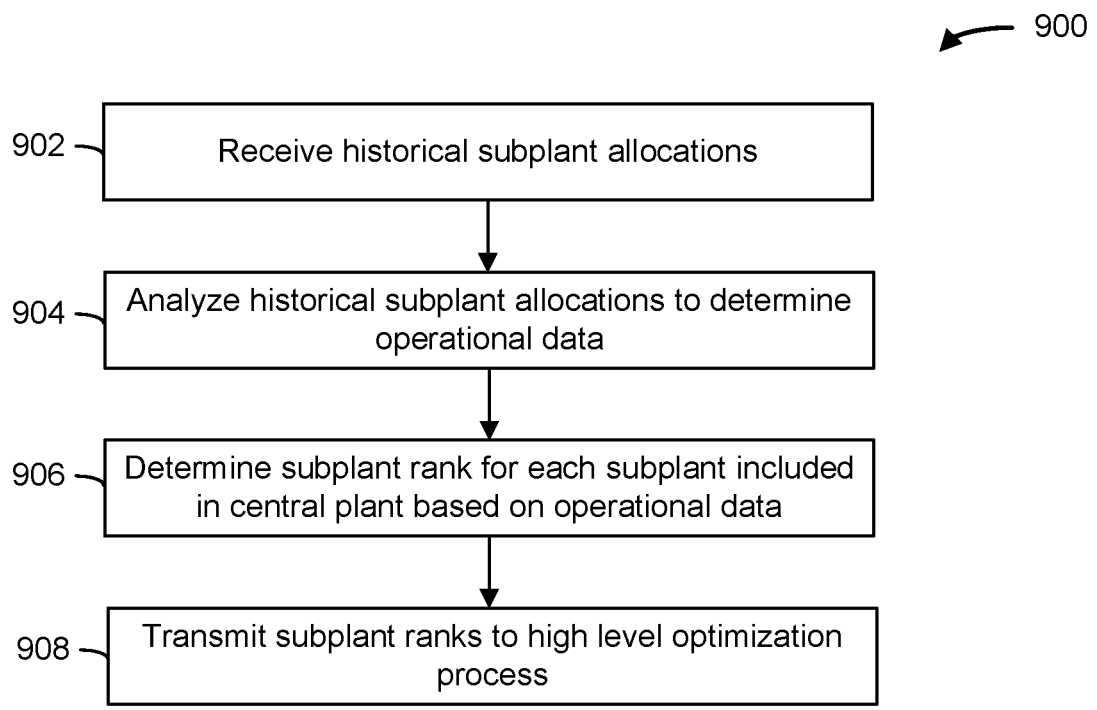
FIG. 9 is a flowchart illustrating a process of determining subplant ranks using historical subplant allocations, according to some embodiments.

Referring now to FIG. 9, a process 900 for determining a subplant rank for each subplant included in a central using historical subplant allocations is shown, according to some embodiments. In general, the process 900 can be performed by allocation rank generator 504 to generate a subplant rank for each subplant included in a central plant by analyzing historical subplant allocations for each subplant determined by a previously performed high level optimization process (e.g., the high level optimization process performed by high level optimizer 440), according to some embodiments. In some embodiments, the historical subplant allocations is analyzed to determine the time steps at which each subplant was historically loaded (e.g., allocated a load), determine the historical amount of load allocated to each subplant at a particular previous time step, and use the historical amount of load allocated to a particular subplant at a particular previous time step in comparison to the historical amount of load allocated to each other subplant at the particular previous time step. In some such embodiments, the comparison of subplant load allocation data is used to determine an order in which each subplant is allocated a load at each time step in the prediction window. For example, the historical subplant allocation data for two chiller subplants may include that the first chiller subplant was allocated, at a particular previous time step, a load of 500 tons while the second chiller subplant was allocated, at the particular previous time step, a load of 250 tons. The allocation of a larger load to the first chiller subplant may indicate that the first chiller subplant receives a subplant rank (e.g., rank 1) less than the second chiller subplant (i.e., rank 2).

In some embodiments, the subplant ranks determined by performing process 900 are used to compare and/or verify the subplant ranks generated using the process 700. For example, the process 900 may be performed by allocation rank generator 504 in order to further verify the subplant ranks generated by the process 700 performed by rank questionnaire module 502. In some embodiments in which the subplant ranks determined by process 900 are not substantially the same as the subplant ranks determined by process 700, a user selects which subplant ranks are to be assigned (i.e., subplant ranks determined by process 900 or subplant ranks determined by process 700). In further embodiments, the subplant ranks generated by performing process 900 can be edited, altered, or otherwise changed by a user in order to customize the subplant ranks.

Process 900 is shown to include receiving historical subplant allocations for each subplant included in a central plant (step 902), according to some embodiments. In some embodiments, the historical subplant allocations received at step 902 includes subplant allocations determined by a previously performed high level optimization process. In some embodiments, step 902 is performed by allocation rank generator 504. In some embodiments, the historical subplant allocations received at step 902 includes subplant load allocation amount for each subplant included in a central and the time step at which each subplant load allocation amount was allocated to each subplant. In some embodiments, the historical subplant allocations received at step 902 includes data for each previous time step over a previous prediction window. In other embodiments, the historical subplant allocations received at step 902 includes data for a single previous time step. In some embodiments, the number of time steps in which the subplant allocation data is included is configurable based on user preference.

Process 900 is shown to involve analyzing the historical subplant allocations to determine operational data of the subplants associated with the historical subplant allocations (step 904), according to some embodiments. In some embodiments, step 904 involves comparing historical subplant allocations for each subplant at a particular time step in order to determine an operational preference between two or more subplants at the particular time step. In some embodiments, step 904 involves analyzing historical subplant allocations for each time step included in a prediction window. In some embodiments, step 904 involves determining that one or more particular subplants are not allocated at one or more particular time steps. In some such embodiments, step 904 involves determining that the one or more particular subplants do not receive a subplant rank at the one or more particular time steps.

Process 900 is shown to involve determining a subplant rank for each subplant included in a central plant based on the operational data (step 906), according to some embodiments. In some embodiments, step 906 involves determining subplant ranks for each subplant based on the order of operation preferences determined by comparing the subplant allocations for each subplant. For example, a determined order of operation preference based on analyzing operational may include a first chiller subplant is loaded up before a second chiller subplant. As a result, the first chiller subplant may be assigned "rank 1" while the second chiller subplant may be assigned "rank 2."

Process 900 is shown to involve transmitting the subplant ranks to a high level optimization process (step 908), according to some embodiments. In some embodiments, step 908 involves transmitting the subplant ranks to high level optimizer 440 for use in a high level optimization process to determine subplant load allocations for each time step in the prediction horizon based on the subplant ranks, according to some embodiments.

Determining Subplant Ranks Based on Models

Figure 10:
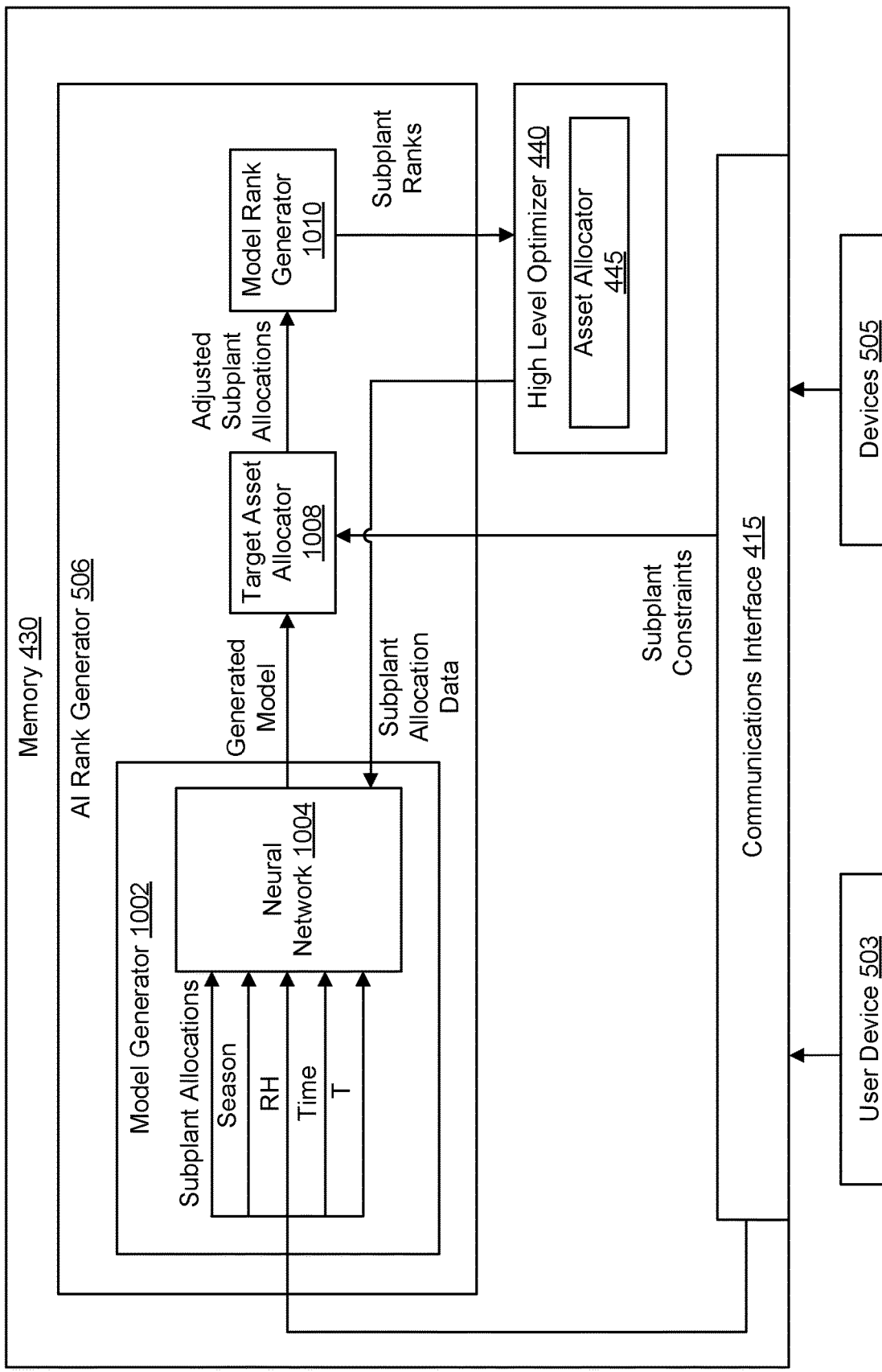
FIG. 10 is a block diagram illustrating an AI rank generator included in the offline rank generator of FIG. 5, according to some embodiments.

Referring now to FIG. 10, a block diagram illustrating the AI rank generator 506 in greater detail is shown, according to some embodiments. AI rank generator 506 is shown to include a model generator 1002, according to some embodiments. In some embodiments, model generator 1002 is shown to include a neural network 1004 configured to generate a neural network model for subplant allocations based on building environment data and/or central plant that is provided to neural network 1004. In some embodiments, neural network 1004 receives building environment data including season (e.g., time of year), relative humidities of one or more spaces RH, time of day, load consumed by the central plant, and a temperature measurement of one or more spaces T. The building environment data can also include other forms of data such as building air pressure and occupancy, according to some embodiments. In some embodiments, the building environment data provided to neural network 1004 is entered via user device 503. In some embodiments, the building environment data provided to neural network 1004 is time series data. If the building environment data is time series data, neural network 1004 may be able to better model subplant allocations based on time-dependent information. For example, based on time series data, neural network 1004 may determine that a larger chiller subplant allocation is generally present mid-day than at night (e.g., due to the sun, due to more occupants in a building, etc.). It should be considered that the building environment data provided to neural network 1004 in FIG. 10 is shown as an example of some building data that can be provided to neural network 1004. In some embodiments, the building environment data provided to neural network 1004 includes more or less information than is shown in FIG. 10. For example, neural network 1004 can receive any sensor or user input information that is relevant to building environment data.

Model generator 1002 is shown to provide the generated neural network model to target asset allocator 1008 for use in generating adjusted subplant load allocations, according to some embodiments. The generated neural network model provided by neural network 1004 may not incorporate high level constraints when determining a subplant load allocation. High level constraints, herein referred to as subplant constraints, can include minimum turndown (MTD) values of each subplant, maximum capacity (CAP) of each subplant to produce a resource, etc. that define one or more limits for the operation and/or capability of each subplant to produce a resource, according to some embodiments. The target asset allocator 1008 is shown to receive the subplant constraints for use with the generated neural network provided by neural network 1004 in order to determine adjusted subplant allocations, according to some embodiments. In some embodiments, the high level constraints are transmitted to target asset allocator 1008 from devices 505. In some embodiments, devices 505 includes one or more subplants controlled by central plant controller 410. The adjusted subplant allocations determined by target asset allocator 1008 adhere to the limitations defined by the subplant constraints. For example, a chiller subplant with an MTD value of 200 tons and CAP of 500 tons may be provided an adjusted subplant allocation of 300 tons. In some embodiments, the adjusted subplant allocations determined by target asset allocator 1008 are provided to low level optimizer 450 for use in determining device allocation for one or more devices included in each subplant. In some such embodiments, control signals are generated to operate the one or more devices included in each subplant based on the device allocation and/or the adjusted subplant allocations determined by target asset allocator 1008.

Target asset allocator 1008 is shown to provide the adjusted subplant load allocations to model rank generator 1010 for use in determining a subplant rank for each subplant included in the central plant, according to some embodiments. In some embodiments, the subplant rank for each subplant is determined by model rank generator 1010 based on the order of operation preferences determined by comparing the adjusted subplant allocations for each subplant. For example, a determined order of operation preference based on the adjusted subplant allocations may indicate that a first chiller subplant is loaded up before a second chiller subplant. As a result, the first chiller subplant may be assigned "rank 1" while the second chiller subplant may be assigned "rank 2." Model rank generator 1010 is shown to output the subplant ranks to high level optimizer 440 at for use in a high level optimization process to determine subplant load allocations for each time step in the prediction horizon based on the subplant ranks determined by model rank generator 1010, according to some embodiments.

Referring now to FIG. 11, an unadjusted allocation diagram 1100 representing the subplant load allocation values as can be generated as an output of the neural network model generated by model generator 1002 is shown, according to some embodiments. The unadjusted allocation diagram 1100 represents a scenario in which subplant constraints (e.g., MTD value, CAP, etc.) is not factored into determining subplant allocations. Unadjusted allocation diagram 1100 is shown to include subplant allocations to chiller subplant A 1102, chiller subplant B 1104, chiller subplant C 1106, and chiller subplant D 1108, according to some embodiments. Chiller subplant A 1102, chiller subplant B 1104, chiller subplant C 1106, and chiller subplant D 1108 are operable to provide chilled water (CHW) load to a building CHW load 1110. Building CHW load 1110 is shown to consume 950 tons of CHW. Based on the subplant allocation values as determined by the neural network model generated by model generator 1002, chiller subplant A 1102 may be allocated a load of 305 tons, chiller subplant B 1104 may be allocated a load of 235 tons, chiller subplant C 1106 may be allocated a load of 250 tons, and chiller subplant D 1108 may be allocated a load of 84 tons.

Each chiller subplant A 1102-chiller subplant D 1108 is shown to include constraints MTD of 100 tons and CAP of 300 tons such that an operable region of each subplant is 100 tons-300 tons, according to some embodiments. The subplant allocation outputs of the neural network model generated by model generator 1002 do not incorporate these subplant constraints as represented by unadjusted allocation diagram 1100. As a result, the neural network model may provide allocations to the subplants outside of the operable region of 100-300 tons. Chiller subplant A 1102 is shown to be allocated a load of 305 tons (i.e., greater than the 300 capacity value) and chiller subplant D 1108 is shown to be allocated a load of 84 tons (i.e., less than the 100 MTD value). The sum 1112 of the load provided to building CHW load 1110 is 874 tons. As previously understood, building CHW load 1110 may require 950 tons and the sum 1112 being 874 tons is less than the load required by the building.

Referring now to FIG. 12, an adjusted allocation diagram 1200 is shown representing subplant load allocation values as can be generated by target asset allocator 1008 using the neural network model generated by model generator 1002 and subplant constraints, according to some embodiments. The adjusted allocation diagram 1200 is shown to include similar chiller subplant A 1102, chiller subplant B 1104, chiller subplant C 1106, and chiller subplant D 1108 operating to provide chilled water (CHW) load to a similar building CHW load 1110. As previously described, the target asset allocator 1008 is configured to incorporate subplant constraints to determine subplant load allocation values that are within the operable region of each subplant.

Each chiller subplant A 1102-chiller subplant C 1108 receives an adjusted subplant allocation, determined by target asset allocator 1008, that adheres to each subplant constraint. Chiller subplant A 1102 is allocated a load of 300 tons, chiller subplant B 1104 is allocated a load of 250 tons, chiller subplant C 1106 is allocated a load of 300 tons, and chiller subplant D 1108 is allocated a load of 100 tons. The subplant allocations adhere to the subplant constraints of each chiller subplant and, in addition, satisfy the building CHW load of 950 (represented by the sum of allocations 1212).

Figure 13:
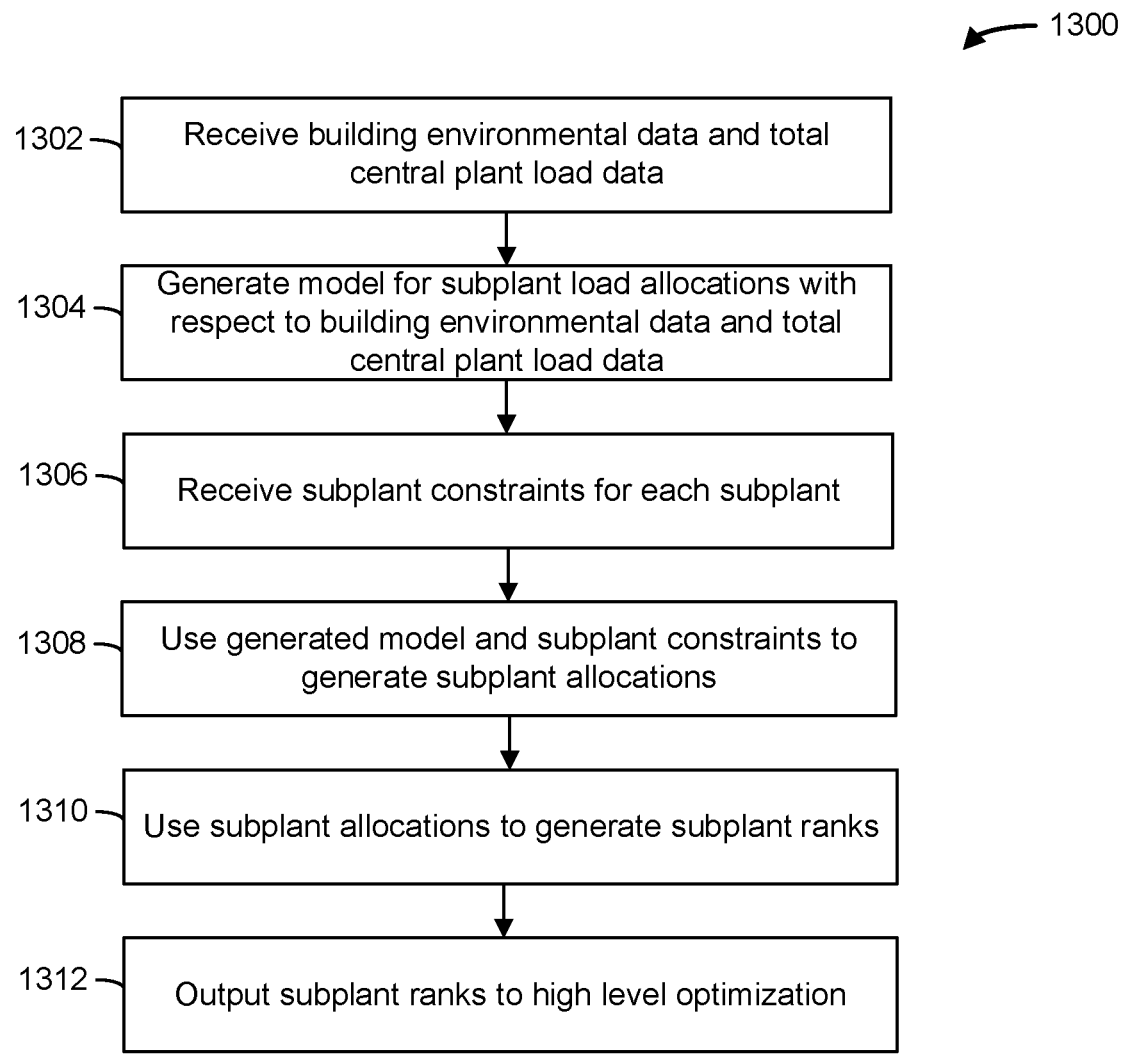
FIG. 13 is a flowchart illustrating a process of generating model and using the model to determine subplant ranks which can be performed by the AI rank generator of FIG. 10, according to some embodiments.

Referring now to FIG. 13, a process 1300 for generating a neural network model and using the generated neural network model to generate subplant ranks for each subplant in a central plant is shown, according to some embodiments. The process 1300 can be performed by AI rank generator 506 and components included therein, according to some embodiments. Process 1300 can be continuously and/or occasionally performed to update subplant ranks. For example, process 1300 may be performed every hour to update subplant ranks. In some embodiments, process 1300 can be performed for every time in a prediction window.

Process 1300 is shown to include receiving building environmental data and central plant load data (step 1302). The building environmental data received in step 1302 can include, for example, season (e.g., time of year), relative humidities of one or more spaces, time of day, total load consumed by the central plant, and a temperature measurements of one or more spaces. The received building environmental data may be provided by building devices, a thermostat, external services, user devices (e.g., smartphones, personal computers, etc.) or any other device/service capable of providing information pertinent to generate subplant load allocations. In some embodiments, step 1302 is performed by model generator 1002.

Process 1300 is shown to include generating a model (e.g., trained neural network model) for subplant load allocation values with respect building environmental data and central plant data (step 1304), according to some embodiments. The generated model can allow for subplant load allocations to be determined provided building environmental data and central plant data, etc., that can affect a load (e.g., chilled water load, hot water load, etc.) consumed by a building. In some embodiments, step 1304 is performed by model generator 1002.

Process 1300 is shown to include receiving subplant constraints for each subplant included in a central plant (step 1306), according to some embodiments. The received subplant constraints in step 1306 can include, for example, minimum turndown value of each subplant, maximum capacity of each subplant, etc. The received subplant constraints may be provided by each subplant, from a database storing subplant constraint data (not shown), a user device (e.g., smartphones, personal computers, etc.), or any other device capable of providing information relating to subplant constraints of each subplant included in the central plant. In some embodiments, step 1306 is performed by target asset allocator 1008.

Process 1300 is shown to include using the generated model and the subplant constraints to generate subplant allocations (step 1308), according to some embodiments. In some embodiments, the subplant constraints used in step 1308 define an operable range in which each subplant can feasibly operate (e.g., without causing mechanical failures, without operating outside of an efficiency threshold, etc.). For example, the subplant constraints may include a minimum turndown (MTD) value and a capacity value for each subplant. The MTD value may define a minimum subplant allocation that a particular subplant can operate at while the capacity value may define a maximum amount of a resource that the particular subplant can produce. The feasible operation range may be defined as subplant allocation values ranging between the MTD value and the capacity value. The subplant allocations generated in step 1308 using the generated model can be adjusted to abide by such subplant constraints, according to some embodiments. In some embodiments, step 1308 is performed by target asset allocator 1008.

Process 1300 is shown to include using the subplant allocations to generate subplant ranks (step 1310), according to some embodiments. In some embodiments, the subplant rank for each subplant is determined based on the order of operation preferences determined by comparing the subplant load allocation generated for each subplant in step 1308. For example, a determined order of operation preference based on the subplant load allocation may indicate a first chiller subplant is loaded up before a second chiller subplant. As a result, the first chiller subplant may be assigned "rank 1" while the second chiller subplant may be assigned "rank 2." In some embodiments, step 1310 is performed by model rank generator 1010. The subplant ranks determined in step 1310 are transmitted to high level optimizer 440 at step 1312 for use in a high level optimization process to determine subplant load allocations for each time step in the prediction horizon based on the subplant ranks determined in step 1310, according to some embodiments.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for a central plant having a plurality of subplants that operate to produce one or more resources consumed by a building, the controller comprising:
a processing circuit comprising a processor and memory storing instructions executed by the processor, wherein the memory comprises:
an offline rank generator configured to receive historical subplant allocation data and generate a plurality of subplant ranks based on the historical subplant allocation data, wherein each of the plurality of subplant ranks is associated with one of the plurality of subplants and defines a priority of each subplant with respect to production of a resource relative to other subplants that produce the resource; and
a high level optimizer configured to use the plurality of subplant ranks associated with each of the plurality of subplants to determine resource allocation of the plurality of subplants according to the plurality of subplant ranks; and
wherein the processing circuit is configured to operate the plurality of subplants according to the resource allocation.

2. The controller of claim 1, wherein the offline rank generator comprises an allocation rank generator configured to receive the historical subplant allocation data from the high level optimizer and determine, based on the historical subplant allocation data, the plurality of subplant ranks.

3. The controller of claim 1, wherein the offline rank generator comprises an AI rank generator configured to receive the historical subplant allocation data from the high level optimizer and a plurality of building data to generate a model using the historical subplant allocation data and the plurality of building data.

4. The controller of claim 3, wherein the model is used to generate a plurality of future subplant load allocations for use in determining the plurality of subplant ranks.

5. The controller of claim 4, wherein the model generated by the AI rank generator is a neural network.

6. The controller of claim 1, wherein the offline rank generator comprises a rank questionnaire module configured to generate a series of questions to a user, wherein the series of questions is associated with a plurality of operational characteristics of the central plant.

7. The controller of claim 6, wherein the rank questionnaire module is configured to receive at least one user response from the user to the series of questions, wherein the at least one user response is used to determine the plurality of subplant ranks.

8. A method of controlling a central plant having a plurality of subplants that operate to produce one or more resources consumed by a building, comprising:
- determining a plurality of subplant ranks based on operational characteristics of the central plant, wherein each of the plurality of subplant ranks is associated with one of the plurality of subplants and defines a priority of each subplant with respect to production of a resource relative to other subplants that produce the resource;
- determining resource allocation of the plurality of subplants according to the plurality of subplant ranks; and
- operating the plurality of subplants according to the resource allocation.

9. The method of claim 8, wherein determining the plurality of subplant ranks based on operational data of the central plant further comprises:
- obtaining user data in response to a series of questions, wherein the user data defines the operational characteristics of the central plant; and
- determining the plurality of subplant ranks based on the user data.

10. The method of claim 8, wherein determining the plurality of subplant ranks based on operational data of the central plant further comprises:
- obtaining a plurality of historical subplant load allocation data, wherein the plurality of historical subplant load allocation data defines a historical resource allocation of the plurality of subplants from a previous prediction window; and
- determining the plurality of subplant ranks based on the plurality of historical subplant load allocation data.

11. The method of claim 8, wherein determining the plurality of subplant ranks based on operational data of the central plant further comprises:
- obtaining a plurality of historical subplant load allocation data, wherein the plurality of historical subplant load allocation data defines a historical resource allocation of the plurality of subplants from a previous prediction window;
- obtaining a plurality of building data;
- generating a model based on the plurality of historical subplant load allocation data and the plurality of building data; and
- determining the plurality of subplant ranks based on an output of the model.

12. The method of claim 11, wherein generating the model based on the plurality of historical subplant load allocation data and the plurality of building data involves generating a neural network.

13. A controller for a central plant having a plurality of subplants that operate to produce one or more resources consumed by a building, the controller comprising:
- a processing circuit comprising a processor and memory storing instructions executed by the processor, wherein the memory comprises:
  - an offline rank generator configured to receive user data and generate a plurality of subplant ranks based on the user data, wherein each of the plurality of subplant ranks is associated with one of the plurality of subplants and defines a priority of each subplant with respect to production of a resource relative to other subplants that produce the resource; and
  - a high level optimizer configured to use the plurality of subplant ranks associated with each of the plurality of subplants to determine resource allocation of the plurality of subplants according to the plurality of subplant ranks; and
- wherein the processing circuit is configured to operate the plurality of subplants according to the resource allocation.

14. The controller of claim 13, wherein the offline rank generator comprises a rank questionnaire module configured to generate a series of questions to a user, wherein the series of questions is associated with a plurality of operational characteristics of the central plant.

15. The controller of claim 14, wherein the rank questionnaire module is configured to receive at least one user response from the user to the series of questions, wherein the at least one user response is used to determine the plurality of operational characteristics of the central plant.

16. The controller of claim 15, wherein the at least one user response to the series of questions is used to determine the plurality of subplant ranks.

17. The controller of claim 13, wherein the offline rank generator is configured to receive historical subplant allocation data and generate the plurality of subplant ranks based on the historical subplant allocation data.

18. The controller of claim 17, wherein the offline rank generator comprises an allocation rank generator configured to receive the historical subplant allocation data from the high level optimizer and determine, based on the historical subplant allocation data, the plurality of subplant ranks.

19. The controller of claim 17, wherein the offline rank generator comprises an AI rank generator configured to receive the historical subplant allocation data from the high level optimizer and a plurality of building data to generate a model using the historical subplant allocation data and the plurality of building data.

20. The controller of claim 19, wherein the model is used to generate a plurality of future subplant load allocations for use in determining the plurality of subplant ranks.

* * * * *